United States Patent
Merrill

[11] Patent Number: 5,880,460
[45] Date of Patent: Mar. 9, 1999

[54] ACTIVE PIXEL SENSOR CELL THAT REDUCES NOISE IN THE PHOTO INFORMATION EXTRACTED FROM THE CELL

[75] Inventor: Richard Billings Merrill, Woodside, Calif.

[73] Assignee: Foveonics, Inc., Cupertino, Calif.

[21] Appl. No.: 871,519

[22] Filed: Jun. 9, 1997

Related U.S. Application Data

[63] Continuation-in-part of Ser. No. 707,933, Sep. 10, 1996.
[51] Int. Cl.$^6$ .................................................. H04N 5/335
[52] U.S. Cl. ...................... 250/208.1; 348/308; 348/306
[58] Field of Search ...................... 250/208.1; 348/302, 348/304, 306–308, 241

[56] References Cited

U.S. PATENT DOCUMENTS

| | | | |
|---|---|---|---|
| 4,858,022 | 8/1989 | Suzuki | 358/471 |
| 5,134,489 | 7/1992 | Sauer | 358/213.26 |
| 5,717,199 | 2/1998 | Carbone et al. | 250/208.1 |
| 5,796,431 | 8/1998 | Yonemoto | 348/308 |

OTHER PUBLICATIONS

Nixon, R.H. et al., "FA 11.1: 256×256 CMOS Active Pixel Sensor Camera-on-a-Chip," 1996 IEEE International Solid-State Circuits Conference, p. 178.

Dickinson, A. et al., "TP 13.5: A 256×256 CMOS Active Pixel Image Sensor with Motion Detection," 1995 IEEE/International Solid–State Circuits Conference, pp. 226–227.

Agwani, S. et al., "A High Spped, Dual Output Channel, Stage Selectable, TDI CCD Image Sensor for High Resolution Applications," pp. 124–133, *SPIE*, vol. 2415, Sep. 1995.

Delbrück, T. et al., "Analog VLSI Phototransduction by continuous–time, adaptive, logarithmic photoreceptor circuits," pp. 1–24, Calif. Inst. of Tech. Computation & Neural Systems Program, CNS Memo No. 30, May 11, 1994.

Delbrück, T., "Imager Circuits," *Synaptics/National Imager Project*, Test Imager Circuit Documentation, pp. 1–8, Aug. 23, 1995.

IM EC VZW, "Fuga data sheet", p. 26, Leuven, Belgium, Aug. 30, 1995.

*Primary Examiner*—Stephone B. Allen
*Attorney, Agent, or Firm*—Limbach & Limbach L.L.P.

[57] ABSTRACT

The noise in the photo information output from a CMOS-based active pixel sensor cell is reduced by setting the voltage on the output of the cell to a predetermined voltage, such as ground or the power supply voltage, each time the cell is read prior to the cell being read.

22 Claims, 11 Drawing Sheets

FIG. 5A $V_{RESET}$
FIG. 5B $V_{N_{IM2}}$
FIG. 5C $V_{RS}$
FIG. 5D $V_{CS}$

FIG. 8

FIG. 9A $V_{RESET}$

FIG. 11A $V_{RESET}$

FIG. 11B $V_{IM2}$

SIGNAL SAMPLE TAKEN

REFERENCE SAMPLE TAKEN

ACTIVE PIXEL SENSOR CELL THAT REDUCES NOISE IN THE PHOTO INFORMATION EXTRACTED FROM THE CELL

RELATED APPLICATION

This application is a continuation-in-part of Ser. No. 08/707,933 filed Sep. 10, 1996 by Richard B. Merrill et al.

BACKGROUND OF THE INVENTION

1. Field of the Invention

The present invention relates to an active pixel sensor cell and, more particularly, to an active pixel sensor cell that reduces noise in the photo information extracted from the cell.

2. Description of the Related Art

Charge-coupled devices (CCDs) have been the mainstay of conventional imaging circuits for converting a pixel of light energy into an electrical signal that represents the intensity of the light energy. In general, CCDs utilize a photogate to convert the light energy into an electrical charge, and a series of electrodes to transfer the charge collected at the photogate to an output sense node.

Although CCDs have many strengths, which include a high sensitivity and fill-factor, CCDs also suffer from a number of weaknesses. Most notable among these weaknesses, which include limited readout rates and dynamic range limitations, is the difficulty in integrating CCDs with CMOS-based microprocessors.

To overcome the limitations of CCD-based imaging circuits, more recent imaging circuits use active pixel sensor cells to convert a pixel of light energy into an electrical signal. With active pixel sensor cells, a conventional photodiode is typically combined with a number of active transistors which, in addition to forming an electrical signal, provide amplification, readout control, and reset control.

Figure 1:
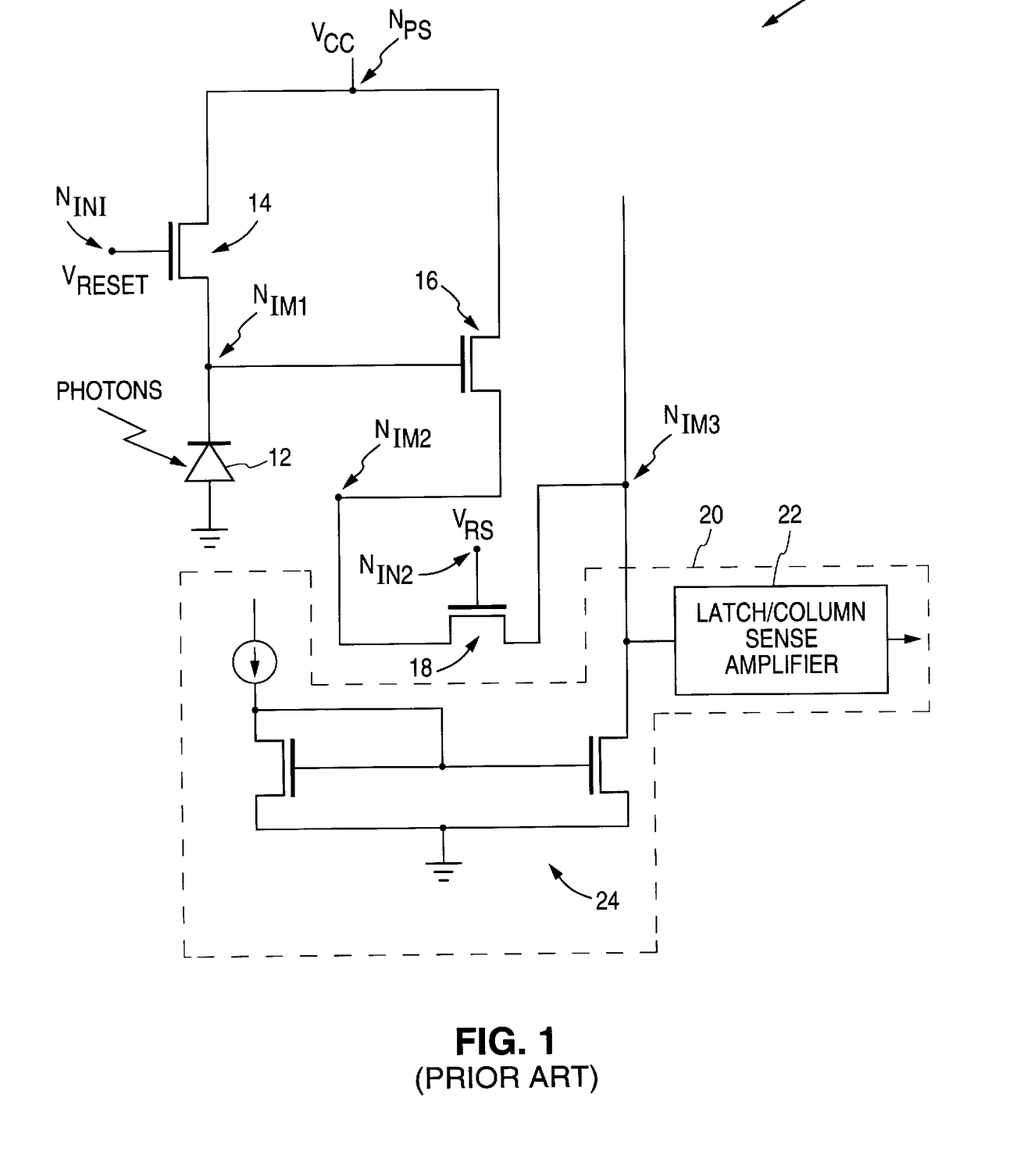
FIG. 1 is a schematic diagram illustrating a conventional active pixel sensor cell 10.

FIG. 1 shows an example of a conventional CMOS active pixel sensor cell 10. As shown in FIG. 1, cell 10 includes a photodiode 12 connected to a first intermediate node $N_{IM1}$, and a reset transistor 14 that has a drain connected to a power supply node $N_{PS}$, a source connected to node $N_{IM1}$, and a gate connected to a first input node $N_{IN1}$.

Cell 10 further includes a buffer transistor 16 and a row select transistor 18. Buffer transistor 16 has a drain connected to node $N_{PS}$, a source connected to a second intermediate node $N_{IM2}$, and a gate connected to node $N_{IM1}$, while row select transistor 18 has a drain connected to node $N_{IM2}$, a source connected to a third intermediate node $N_{IM3}$, and a gate connected to a second input node $N_{IN2}$.

In addition, a detection and calculation circuit 20 is connected to the third intermediate node $N_{IM3}$. As further shown in FIG. 1, circuit 20 includes a latch/column sense amplifier 22 and a current mirror 24 which provides the necessary load for reading out the cells. Current mirror 24 must sink a fairly small current in order to minimize fixed pattern noise that results from mismatches in the channel lengths of the buffer transistors when cell 10 is incorporated into an array of cells 10.

Figure 2A:
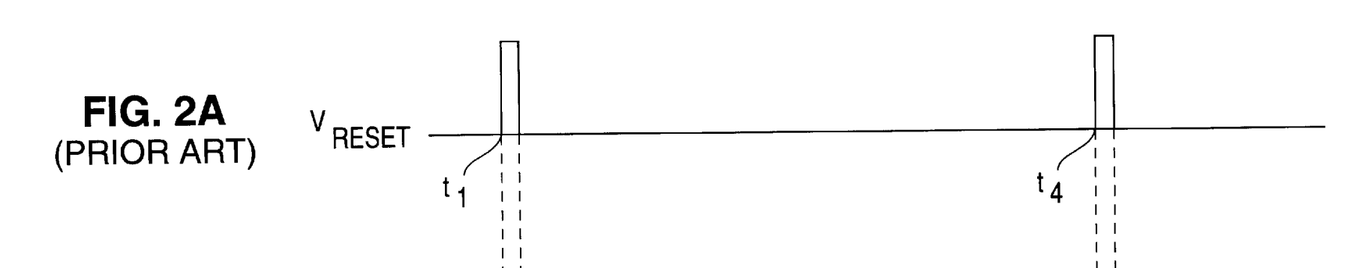
FIGS. 2A–2C are timing diagrams illustrating the operation of active pixel sensor cell 10.
Figure 2B:
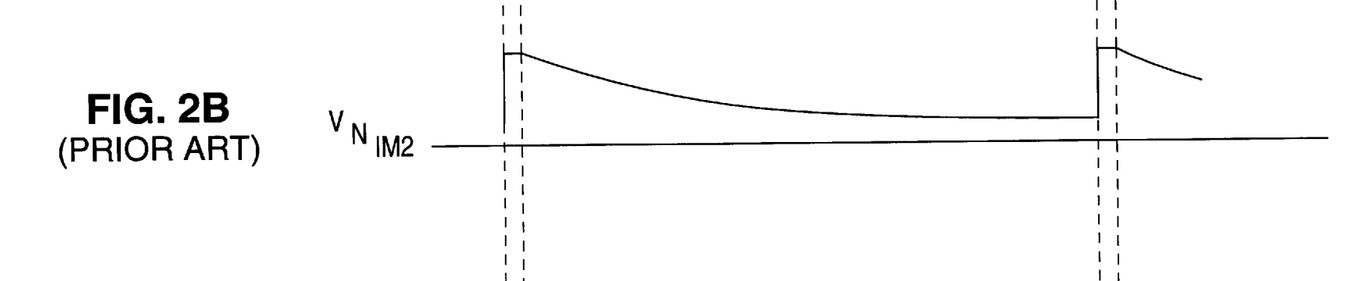
Figure 2C:
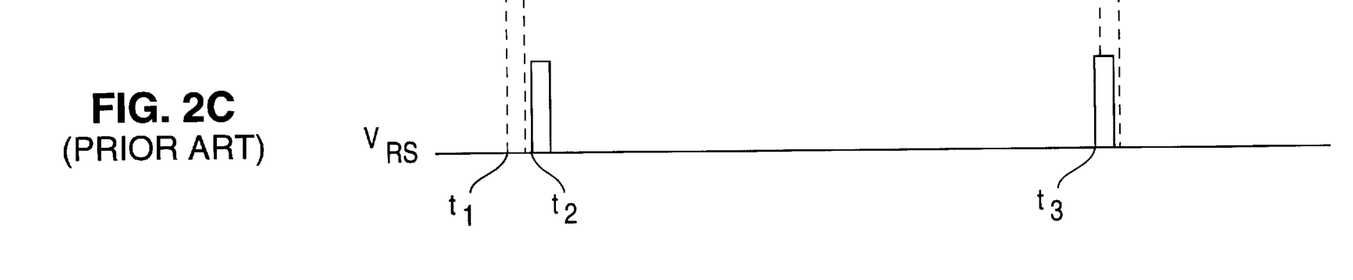

FIGS. 2A–2C show timing diagrams that illustrate the operation of cell 10. As shown in FIGS. 1 and 2A–2C, the operation of cell 10 begins by briefly pulsing the gate of reset transistor 14 with a reset voltage $V_{RESET}$ at time $t_1$. The reset voltage $V_{RESET}$, which is equal to Vcc (+5V), resets the voltage on photodiode 12 to an initial integration voltage to begin an image collection cycle.

At this point, the initial integration voltage on photodiode 12 (the first intermediate node $N_{IM1}$) is defined by the equation $V_{RESET}-V_{T14}-V_{CLOCK}$, where $V_{T14}$ represents the threshold voltage of reset transistor 14, and $V_{CLOCK}$ represents reset noise from the pulsed reset voltage (assumed to be constant). Similarly, the initial integration voltage on the second intermediate node $N_{IM2}$ is defined by the equation $V_{RESET}-V_{T14}-V_{CLOCK}-V_{T16}$, where $V_{T16}$ represents the threshold voltage of buffer transistor 16 (functioning as a source follower).

After the reset voltage $V_{RESET}$ has been pulsed and the voltage on photodiode 12 (the first intermediate node $N_{IM1}$) has been reset, a row select voltage $V_{RS}$ is applied to the second input node $N_{IN2}$ at a time $t_2$ which immediately follows the falling edge of the reset pulse $V_{RESET}$. The row select voltage $V_{RS}$ causes the voltage on the second intermediate node $N_{IM2}$, which represents the initial integration voltage of the cycle, to appear on the third intermediate node $N_{IM3}$. Detection and calculation circuit 20 then amplifies, digitizes, and stores the value of the initial integration voltage as it appears on the third intermediate node $N_{IM3}$.

Next, from time $t_2$, which represents the beginning of the image collection cycle, to a time $t_3$, which represents the end of the image collection cycle, light energy, in the form of photons, strikes photodiode 12, thereby creating a number of electron-hole pairs. Photodiode 12 is designed to limit recombination between the newly formed electron-hole pairs.

As a result, the photogenerated holes are attracted to the ground terminal of photodiode 12, while the photogenerated electrons are attracted to the positive terminal of photodiode 12 where each additional electron reduces the voltage on photodiode 12 (the first intermediate node $N_{IM1}$). Thus, at the end of the image collection cycle, a final integration voltage will be present on photodiode 12 (the first intermediate node $N_{IM1}$).

At this point (time $t_3$), the final integration voltage on photodiode 12 (the first intermediate node $N_{IM1}$) is defined by the equation $V_{RESET}-V_{T14}-V_{CLOCK}-V_S$, where $V_S$ represents the change in voltage due to the absorbed photons. Similarly, the final integration voltage on the second intermediate node $N_{IM2}$ is defined by the equation $V_{RESET}-V_{T14}-V_{CLOCK}-V_{T16}-V_S$.

At the end of the image collection cycle (time $t_3$), the row select voltage $V_{RS}$ is again applied to the second input node $N_{IN2}$. The row select voltage $V_{RS}$ causes the voltage on the second intermediate node $N_{IM2}$, which represents the final integration voltage of the cycle, to appear on the third intermediate node $N_{IM3}$. Detection and calculation circuit 20 then amplifies and digitizes the value of the final integration voltage as it appears on the third intermediate node $N_{IM3}$.

Following this, detection and calculation circuit 20 determines the number of photons that have been collected during the integration cycle by calculating the difference in voltage between the digitized final integration voltage taken at time $t_3$ and the digitized stored initial integration voltage taken at time $t_2$. At this point, the difference is voltage is defined by the equation $(V_{RESET}-V_{T14}-V_{CLOCK}-V_{T16})-(V_{RESET}-V_{T14}-V_{CLOCK}-V_{T16}-V_S)$, thereby yielding the value $V_S$.

Once the final integration voltage has been latched by detection and calculation circuit 20, the reset voltage $V_{RESET}$ is again applied to the first input node $N_{IN1}$ at time $t_4$, which immediately follows the rising edge of the row select voltage $V_{RS}$ at time $t_3$. The reset voltage $V_{RESET}$ again resets the voltage on photodiode 12 to begin another image collection cycle.

One of the problems with active pixel sensor cell 10, however, is that the reset voltage $V_{RESET}$ and the row select voltage $V_{RS}$ have periods, both of which are approximately 30 mS, which are sufficiently long enough to introduce a substantial amount of 1/f noise into the cell. 1/f noise, which results from the trapping and de-trapping of surface charges, can be accurately modeled as variations in the threshold voltages of the reset and buffer transistors 14 and 16.

As a result, the number of photons which are absorbed by photodiode 12 during an image collection period is more properly defined by the equation $(V_{RESET}-V_{T14}-V_{CLOCK}-V_{T16})-(V_{RESET}-V_{T14}-V_{CLOCK}-V_{T16}-V_S-V_\alpha)$, where $V_\alpha$ represents the variations in the threshold voltages of transistors 14 and 16 due to 1/f noise.

Thus, the variations in the threshold voltages of the reset and buffer transistors 14 and 16 add an error term $V_\alpha$ which erroneously yields $V_S+V_\alpha$ as the number of absorbed photons, thereby limiting the accuracy of the cell.

To eliminate the introduction of 1/f noise that results from variations in the threshold voltage of reset transistor 14, a first method of operating cell 10 was disclosed in the parent application where the voltage on the photodiode of the cell was reset to the power supply voltage by utilizing a reset voltage which is greater than the power supply voltage by at least one threshold voltage.

In addition, to further reduce the introduction of 1/f noise, a second method of operating cell 10 was disclosed in the parent application where the cell was read immediately before and after the cell was reset.

Experimental results, however, have indicated that when no signal is present, i.e., when cell 10 is not exposed to a light source, and cell 10 is reset and read according to the method of the parent invention, the voltages read from the third intermediate node $N_{IM3}$, which should be the same, include noise which causes the voltages to differ by tens of millivolts. Thus, there is a need for an active pixel sensor cell and a method for operating the cell which reduces the introduction of this noise.

SUMMARY OF THE INVENTION

The accuracy of an active pixel sensor cell which is reset to a defined voltage and read immediately before and after the cell is reset is limited in part by noise which causes the voltages read out from the cell to differ when no signal is present, i.e., when cell 10 is not exposed to a light source.

The present invention provides an active pixel sensor cell and a method for operating the cell that reduces the introduction of this noise by resetting the voltage on the output of the cell to a predetermined voltage, such as ground or the power supply voltage, each time the cell is read prior to the cell being read.

The active pixel sensor cell of the present invention includes a reset device that has a first input, and a photon collector that is connected to the reset device. In addition, the photon collector has a collected voltage.

The cell also includes a buffer device which is connected to the photon collector and the reset device, and a row select device that is connected to the buffer device and a column line. The buffer device outputs an intermediate voltage that corresponds to the collected voltage. In addition, the row select device has a second input.

In accordance with the present invention, the cell also includes a switch device which is connected to the column line. The switch device places a predetermined voltage on the output of the row select device when pulsed on.

The method of the present invention begins by collecting a number of photons in the photon collector. The number of collected photons sets the collected voltage to a first voltage, and the intermediate voltage to a second voltage. Following this, a predetermined voltage is placed on the column line by pulsing on the switch device.

Next, the second input is pulsed with a row select voltage. The row select voltage turns the row select device on which causes the second voltage to appear on the column line where the second voltage is sensed and then stored.

Following this, the first input is pulsed with a reset voltage. The reset voltage turns on the reset device which sets the collected voltage to a third voltage, and the intermediate voltage to a fourth voltage. After this, the predetermined voltage is again placed on the column line by pulsing on the switch device.

Next, the second input is pulsed with the row select voltage. The row select voltage turns on the row select device which causes the fourth voltage to appear on the column line. Following this, a voltage difference between the fourth voltage and the second voltage is calculated.

A better understanding of the features and advantages of the present invention will be obtained by reference to the following detailed description and accompanying drawings which set forth an illustrative embodiment in which the principals of the invention are utilized.

DETAILED DESCRIPTION

Figure 3A:
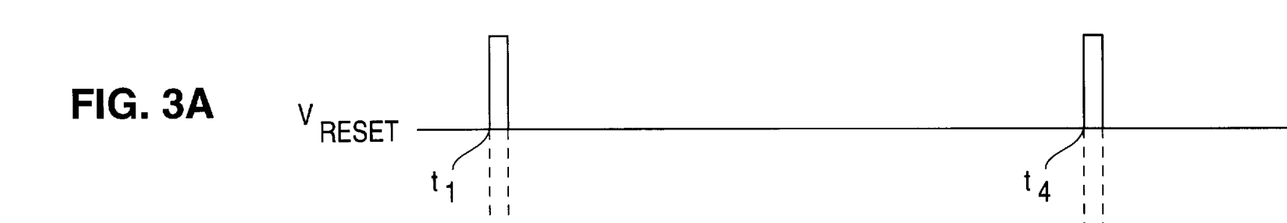
FIGS. 3A–3C are timing diagrams illustrating the operation of active pixel sensor cell 10 in accordance with the parent invention.
Figure 3B:
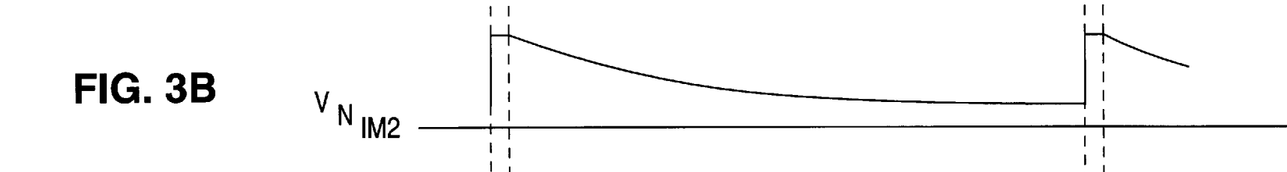
Figure 3C:
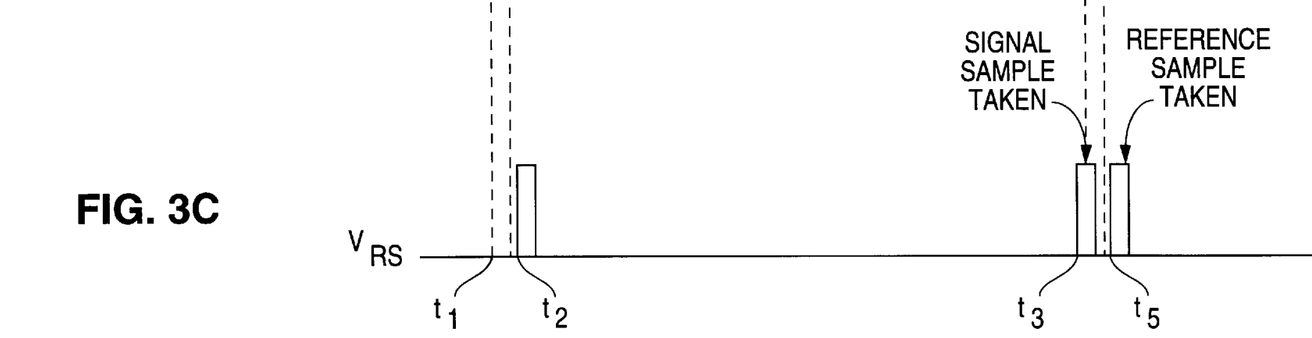

FIGS. 3A–3C are timing diagrams that illustrate the operation of an active pixel sensor cell, such as cell 10 of FIG. 1, in accordance with the parent invention. As shown in FIGS. 1 and 3A–3C, the operation of cell 10 begins, as with conventional cells, by applying the reset voltage $V_{RESET}$ to the first input node $_{IN1}$ at time $t_1$. The reset voltage $V_{RESET}$ resets the voltage on photodiode 12 to begin an image collection cycle.

However, in accordance with the parent invention, the magnitude of the reset voltage $V_{RESET}$ is set to be sufficiently greater than the voltage on the power supply node $N_{PS}$ so that the voltage on the first intermediate node $N_{IM1}$ is pulled up to the voltage on the power supply node $N_{PS}$.

For example, by placing 3.3 volts on the power supply node $N_{PS}$, and by using a 5-volt reset voltage $V_{RESET}$, reset transistor 14 is forced to operate in the linear region which, in turn, pulls up the voltage on the first intermediate node $N_{IM1}$ to 3.3 volts.

The advantage of forcing reset transistor 14 into the linear region of operation during reset is that the voltage on the first intermediate node $N_{IM1}$ is no longer subject to any variation due to changes in the threshold voltage of reset transistor 14 that result from 1/f noise.

As a result, the voltage on photodiode 12 (the first intermediate node $N_{IM1}$) at the beginning of the image collection cycle (time $t_1$) is now defined by the equation $V_R - V_{CLOCK}$, while the voltage on the second intermediate node $N_{IM2}$ is now defined by the equation $V_R - V_{CLOCK} - V_{T16}$.

Thus, while the voltages on the first and second intermediate nodes $N_{IM1}$ and $N_{IM2}$ are conventionally subject to slight variations at the beginning of each integration cycle due to the threshold voltage variations of reset transistor 14 that result from 1/f noise, the method of the parent invention eliminates the effect of 1/f noise from reset transistor 14 by resetting the voltage on the first intermediate node $N_{IM1}$ to a fixed value at the beginning of each integration cycle.

The use of a lower voltage, e.g., 3.3 volts, on the power supply node $N_{PS}$ also provides several additional advantages. One of these advantages is that the noise generated by impact ionization can also be reduced.

Impact ionization noise, which results from electrons striking the lattice under the influence of a strong electric field and forming electron-hole pairs, is most pronounced when buffer transistor 16 is turned on during the signal read out step and a low voltage is on the first intermediate node $N_{IM1}$. With a low voltage (near ground) on the first intermediate node $N_{IM1}$, the voltage on the source of transistor 16 will be a threshold voltage drop lower, while the voltage on the drain will be equal to the voltage on the power supply node $N_{PS}$.

Under these conditions, the use of five volts on the power supply node $N_{PS}$ will cause a substrate current on the order of microamperes to flow from the drain to the source of transistor 16. Since photodiode 12 is sensitive to currents on the order of femtoamperes, only a very small percentage of the impact ionization electrons need to escape beyond the drain region to adjacent photodiodes in order to significantly impact the accuracy of the adjacent photodiodes.

However, by reducing the voltage on the power supply node $N_{PS}$ from 5V to 3.3V, the impact ionization current is reduced by several orders of magnitude, thereby substantially reducing this source of noise.

Another advantage of using a lower voltage on the power supply node $N_{PS}$ is that cell 10 can be easily integrated into CMOS circuits that utilize the same power supply voltages. In addition, lower voltages on the power supply node $N_{PS}$ can be used without significantly limiting the dynamic range of cell 10.

When the exemplary voltages are used, i.e., 3.3V on the power supply node and 5V for the reset voltage, cell 10 has a dynamic range of approximately 3.3V. On the other hand, when five volts are used for both the power supply node and the reset voltage, cell 10 has a dynamic range of approximately 3.5 volts due to the large value of the threshold voltage with back bias. Thus, by dropping the voltage on the power supply node $N_{PS}$ by 1.7V, the dynamic range of cell 10 is only reduced by 0.2 volts.

Returning again to FIGS. 1 and 3, after the reset voltage $V_{RESET}$ has been pulsed and the voltage on photodiode 12 (the first intermediate node $N_{IM1}$) has been pulled up to the voltage on the power supply node $N_{PS}$, the row select voltage $V_{RS}$ is applied to the second input node $N_{IN2}$ at time $t_2$ as described with respect to FIGS. 2A–2C.

The magnitude of the row select voltage $V_{RS}$ is also set to be sufficiently greater than the maximum voltage on the second intermediate node $N_{IM2}$, such as five volts, so that the voltage on the third intermediate node $N_{IM3}$ will track the voltage on the second intermediate node $N_{IM2}$. As a result, row select transistor 18 will not contribute a significant amount of noise since transistor 18 will also operate in the linear region which is not subject to $V_T$ variation.

Next, as with the process of FIGS. 2A–2C, light energy, in the form of photons, strikes photodiode 12, thereby creating a number of electron-hole pairs, during the image collection period that extends from time $t_2$ to time $t_3$. As above, the photogenerated holes are attracted to the ground terminal of photodiode 12, while the photogenerated electrons are attracted to the positive terminal of photodiode 12 where each additional electron reduces the voltage on the first intermediate node $N_{IM1}$.

Following this, the row select voltage $V_{RS}$ is again applied to the second input node $N_{IN2}$ at time $t_3$. The row select voltage $V_{RS}$ causes the voltage on the second intermediate node $N_{IM2}$, which represents the final integration voltage of the cycle, to appear on the third intermediate node $N_{IM3}$. Detection and calculation circuit 20 then amplifies, digitizes, and stores the value of the final integration voltage as it appears on the third intermediate node $N_{IM3}$.

Once the final integration voltage has been latched, the reset voltage $V_{RESET}$ is again applied to the first input node $_{IN1}$ at time $t_4$, which immediately follows the rising edge of the row select voltage $V_{RS}$ at time $t_3$. The reset voltage $V_{RESET}$ again resets the voltage on photodiode 12 to begin another image collection cycle.

After the reset voltage $V_{RESET}$ has been pulsed and the voltage on photodiode 12 (the first intermediate node $N_{IM1}$) has again been pulled up to the voltage on the power supply node $N_{PS}$, the row select voltage $V_{RS}$ is applied to the second input node $N_{IN2}$ at a time $t_5$ which, as with time $t_2$, immediately follows the falling edge of the reset signal $V_{RESET}$.

The row select voltage $V_{RS}$ now causes the voltage on the second intermediate node $N_{IM2}$, which represents the initial integration voltage of the next cycle, to appear on the third intermediate node $N_{IM3}$. Detection and calculation circuit 20 then amplifies and digitizes the value of the initial integration voltage as it appears on the third intermediate node $N_{IM3}$.

In accordance with the parent invention, detection and calculation circuit 20 then calculates the voltage difference between the digitized stored final integration voltage transferred to the third intermediate node $N_{IM3}$ at time $t_3$, which represents when the signal sample is taken, and the digitized initial integration voltage transferred to the third intermediate node $N_{IM3}$ at time $t_5$, which represents when the reference sample is taken, to determine the number of photons that have been collected during the first integration cycle that begins at time $t_2$ and ends at time $t_3$.

Thus, the method of the parent invention determines the number of photons received during an integration cycle by reading the cell at the end of the integration cycle, and immediately after the cell has been reset at the start of the next integration cycle.

The advantage of reading the cell immediately before and after the cell has been reset is that the time between successive reads can be reduced from approximately 30 mS (from the beginning to the end of the integration cycle) to approximately 10 μS (from the end of one integration cycle to the beginning of the next integration cycle). As a result, variations in the voltage on the second intermediate node $N_{IM2}$ due to the threshold voltage variations of buffer transistor 16 that result from 1/f noise can also be substantially reduced.

Experimental results have indicated that when the initial integration voltage on photodiode 12 is reset to the voltage on the power supply node (a fixed value from cycle to cycle), and the cell is read immediately before and after the cell is reset, the imaging cell noise voltage can be reduced by approximately 100 times.

Alternately, if less noise reduction is acceptable, either of these techniques, i.e., resetting the voltage on the photodiode to the voltage on the power supply node $N_{PS}$, or reading the cell before and after the cell is reset, can be used alone.

As noted above, experimental results have further indicated that when no signal is present, i.e., when cell 10 is not exposed to a light source, and cell 10 is read before and after the reset pulse is applied, the voltages read from the third intermediate node $N_{IM3}$, which should be the same, differ by tens of millivolts.

Figure 4:
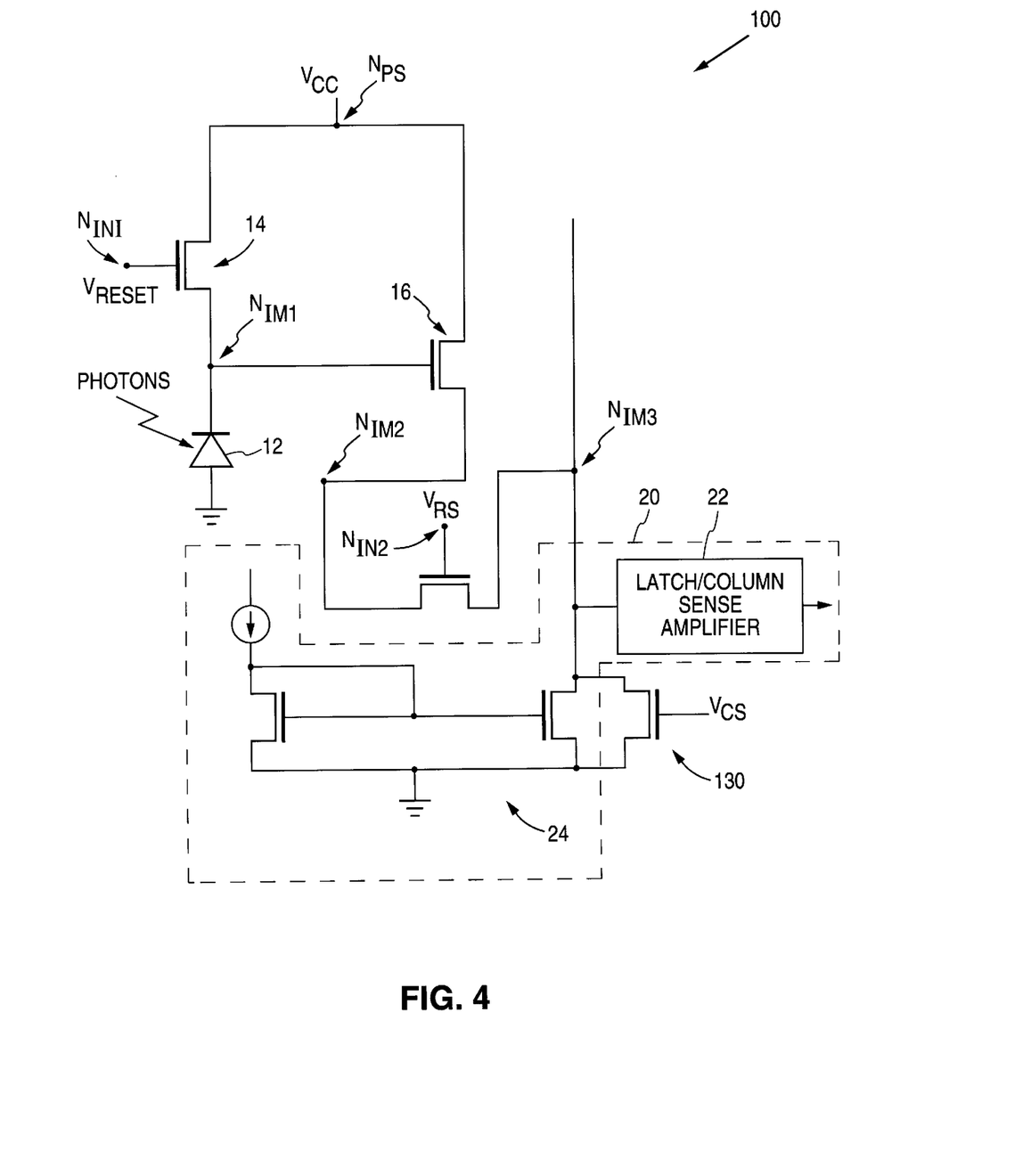
FIG. 4 is a schematic diagram illustrating an active pixel sensor cell 100 in accordance with the present invention.
Figure 5A:
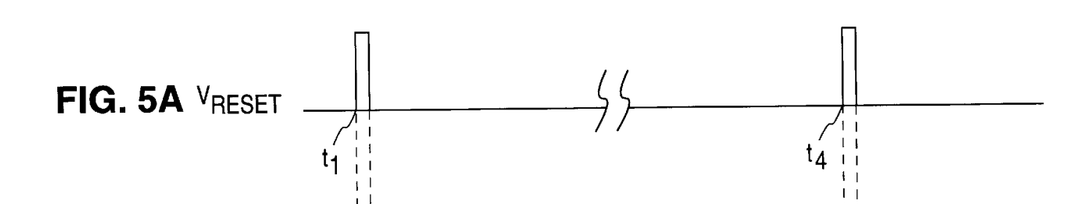
FIGS. 5A–5D are timing diagrams illustrating the operation of cell 100 in accordance with the present invention.
Figure 5B:
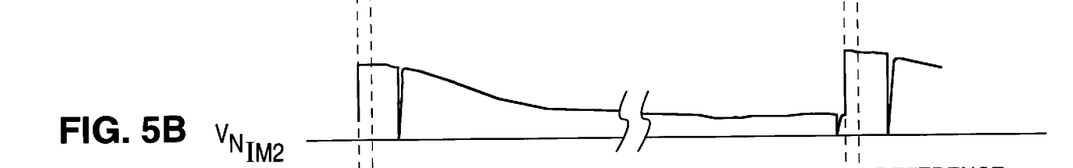
Figure 5C:
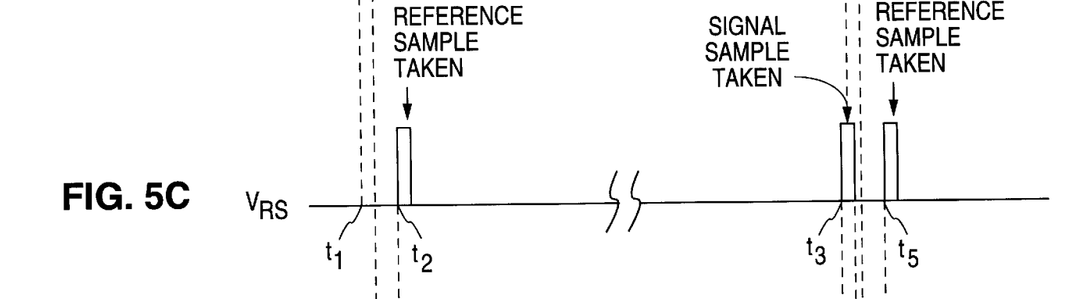
Figure 5D:
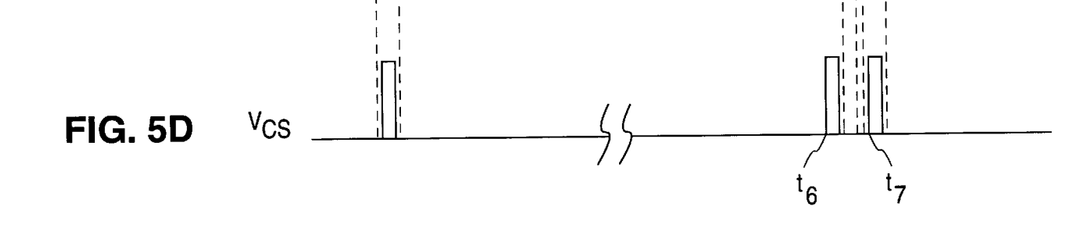
Figure 6A:
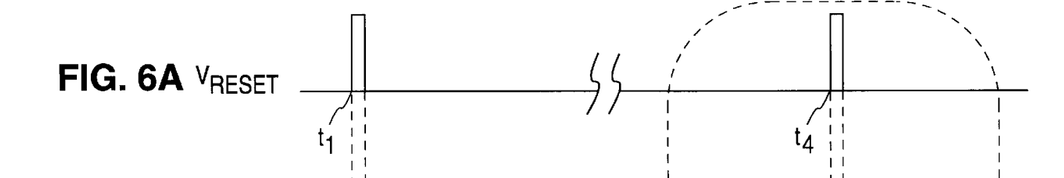
FIGS. 6A–6D are timing diagrams illustrating an alternate operation of cell 100 in accordance with the present invention.
Figure 6B:
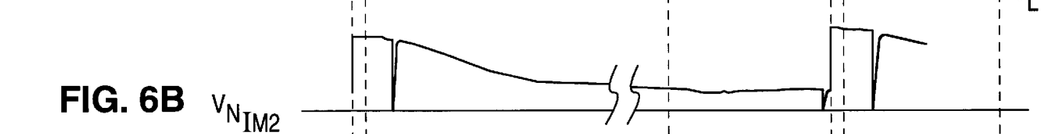
Figure 6C:
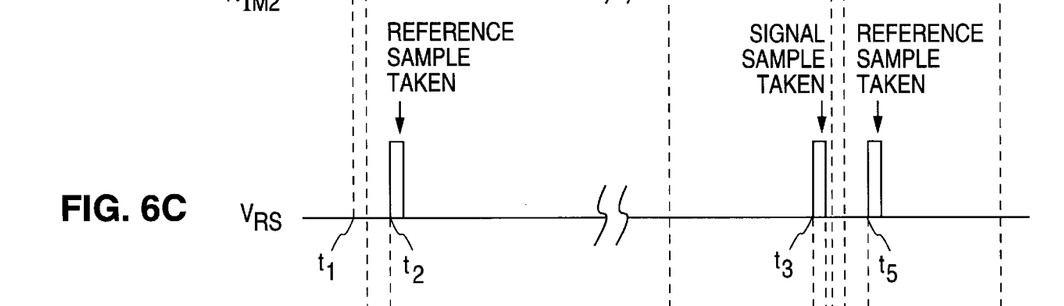
Figure 6D:
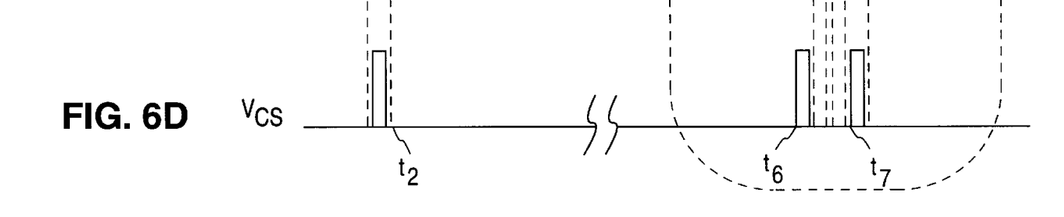
Figure 7A:
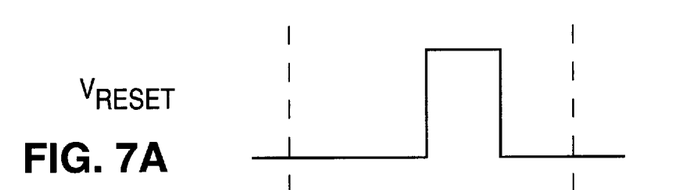
FIGS. 7A–7D are timing diagrams illustrating an enlarged view of loop L in FIGS. 6A–6D in accordance with the present invention.
Figure 7B:
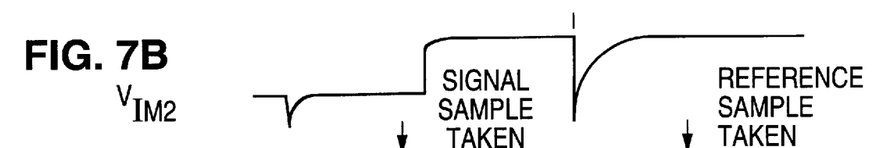
Figure 7C:
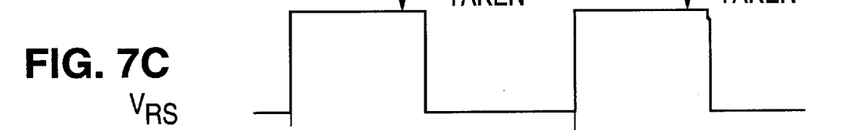
Figure 7D:
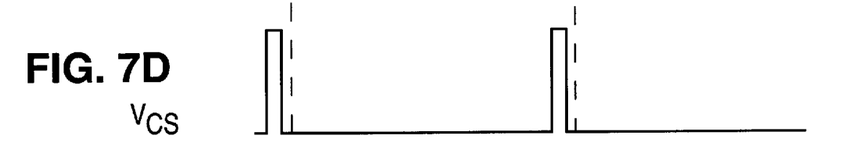

FIG. 4 shows a schematic diagram that illustrates an active pixel sensor cell 100 in accordance with the present invention. As shown in FIG. 4, cell 100 is structurally similar to cell 10 of FIG. 1 and, as a result, utilizes the same reference numerals to designate the structures which are common to both cells.

As shown in FIG. 4, cell 100 principally differs from cell 10 in that cell 100 includes a switch transistor 130 which is connected between the third intermediate node $N_{IM3}$ of cell 100 and ground. In operation, cell 100 utilizes switch transistor 130 to place a defined voltage, namely ground, on the third intermediate node $N_{IM3}$ of cell 100 before cell 100 is read.

FIGS. 5A–5D show timing diagrams that illustrate the operation of cell 100 in accordance with the present invention. As shown in FIGS. 5A–5D, cell 100 is operated the same as shown in FIGS. 3A–3C except that the gate of switch transistor 130 is pulsed with a column reset voltage $V_{CS}$ prior to each pulsing of the row select voltage $V_{RS}$.

Thus, the column reset voltage $V_{CS}$ is pulsed at time $t_6$ prior to pulsing the row select voltage $V_{RS}$ at time $t_3$, and again at time $t_7$ immediately prior to pulsing the row select voltage $V_{RS}$ at time $t_5$. By pulsing the column select voltage $V_{CS}$ prior to each pulsing of the row select voltage $V_{RS}$, the voltage on the third intermediate node $N_{IM3}$ of cell 100 is pulled to zero just prior to cell 100 being read.

Experimental results have indicated that when the voltage on the third intermediate node $N_{IM3}$ of cell 100 is set to zero immediately prior to pulsing the row select voltage $V_{RS}$ at times $t_3$ and $t_5$, the resulting noise is reduced from approximately 15 mV to approximately one millivolt.

FIGS. 6A–6D show timing diagrams that illustrate an alternate operation of cell 100 in accordance with the present invention. As shown in FIGS. 6A–6D, cell 100 is operated the same as shown in FIGS. 5A–5D except that the rising edge of the reset voltage $V_{RESET}$ at time $t_4$ is set to occur after the falling edge of the row select voltage $V_{RS}$ that follows the rising edge at time $t_3$. FIGS. 7A–7D show timing diagrams that illustrate an enlarged view of loop L in FIGS. 6A–6D in accordance with the present invention.

Figure 8:
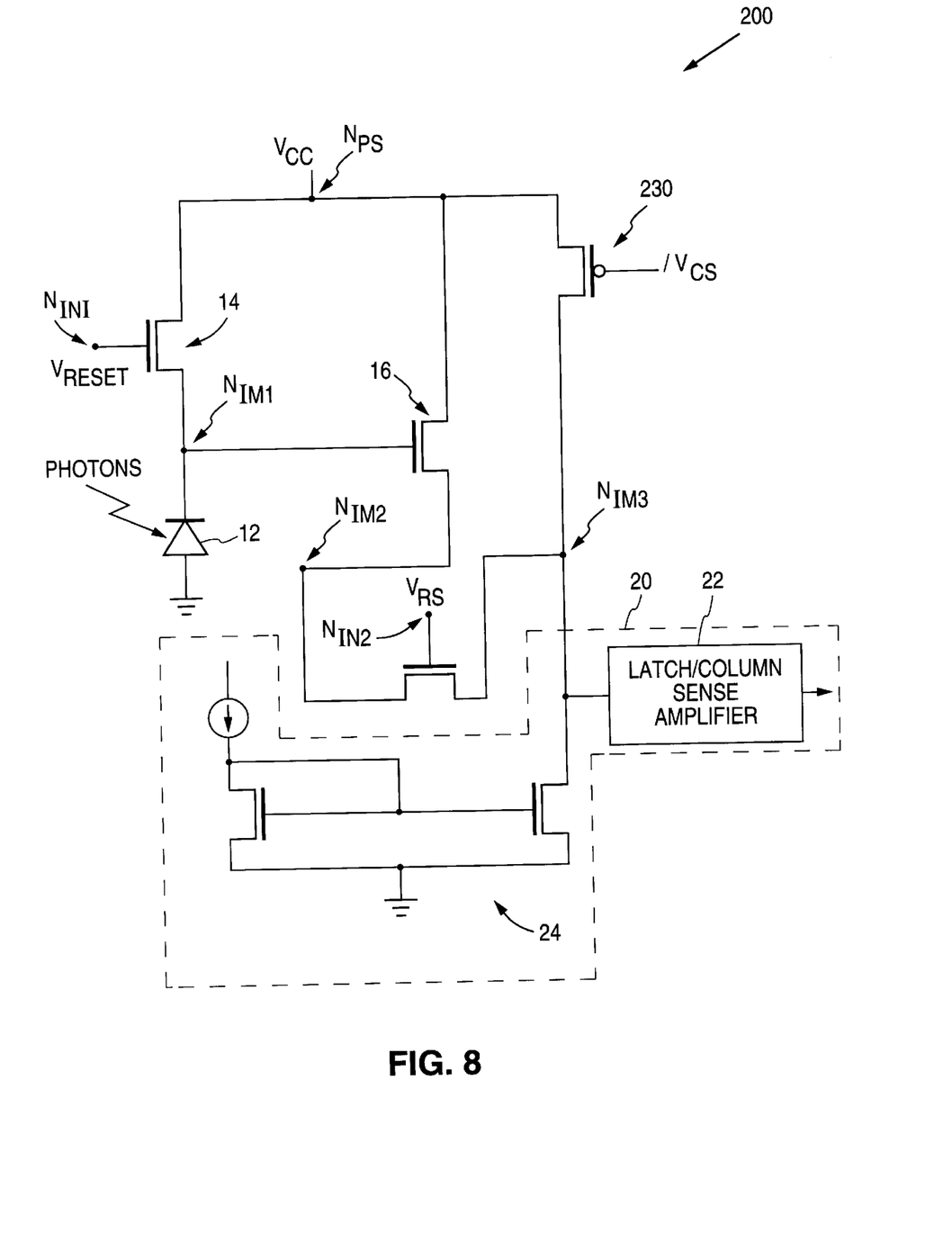
FIG. 8 is a schematic diagram illustrating a cell 200 in accordance with the present invention.
Figures 9A, 9B:
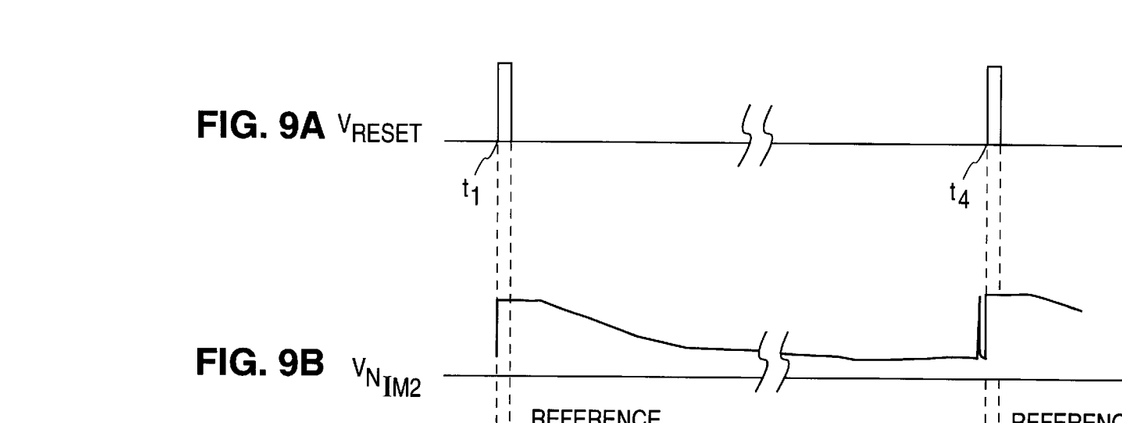
FIGS. 9A–9D are timing diagrams illustrating the operation of cell 200 in accordance with the present invention.
Figure 9C:
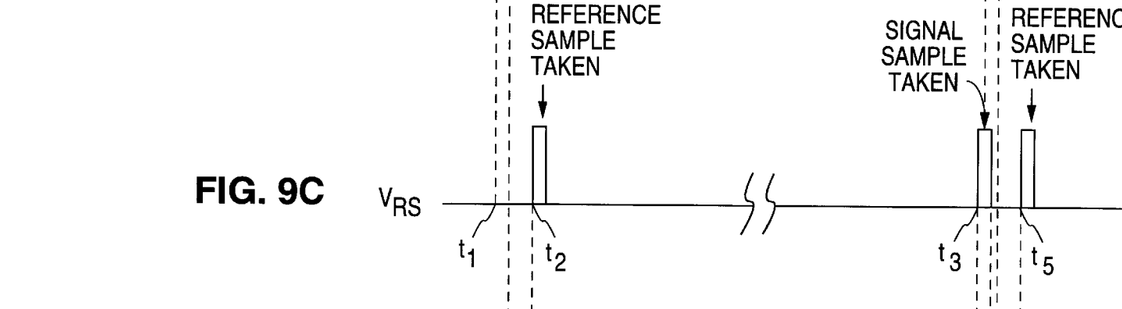
Figure 9D:
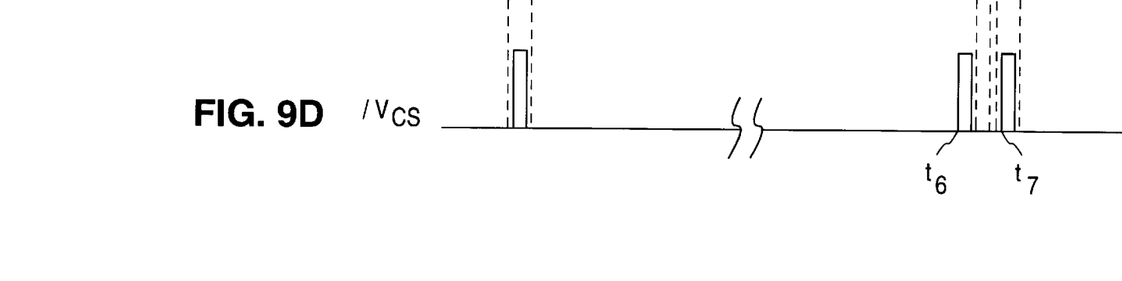
Figure 10A:
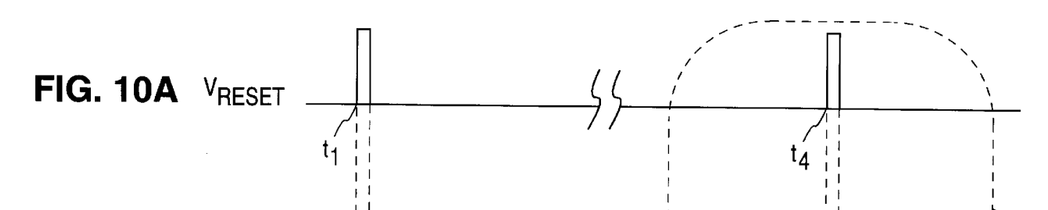
FIGS. 10A–10D are timing diagrams illustrating an alternate operation of cell 200 that corresponds with FIGS. 6A–6D in accordance with the present invention.
Figures 10B, 10C:
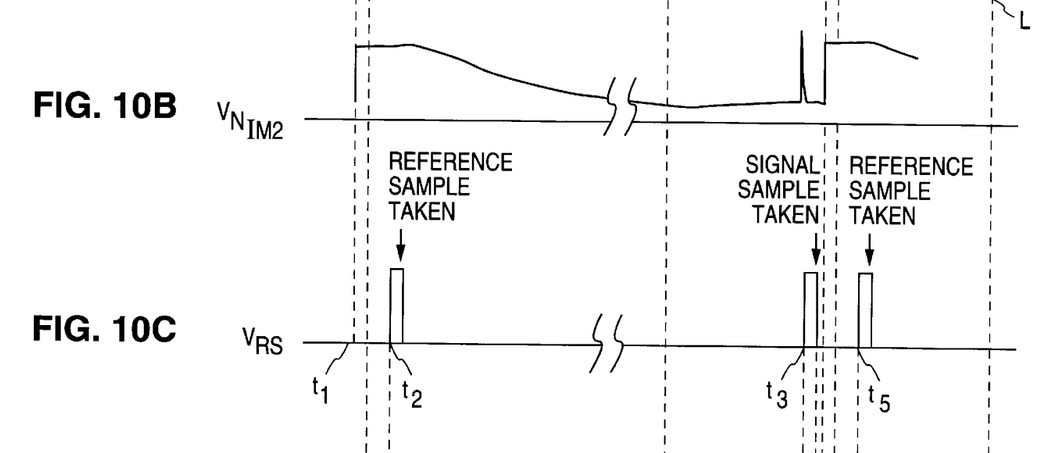
Figure 10D:
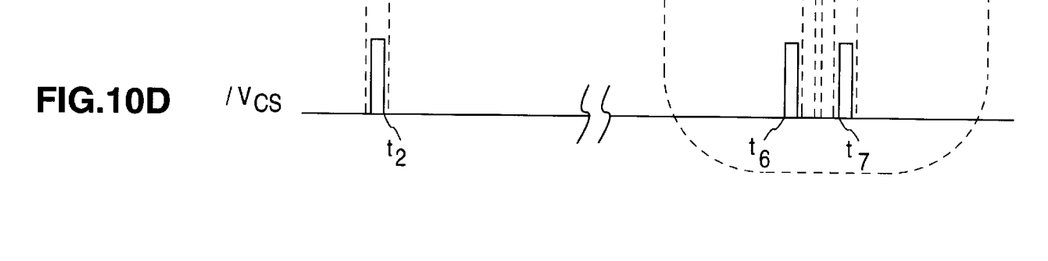
Figure 11A:
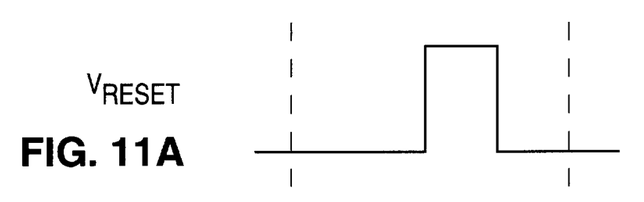
FIGS. 11A–11D are timing diagrams illustrating an alternate operation of cell 200 that corresponds with FIGS. 7A–7D in accordance with the present invention.
Figures 11B, 11C:
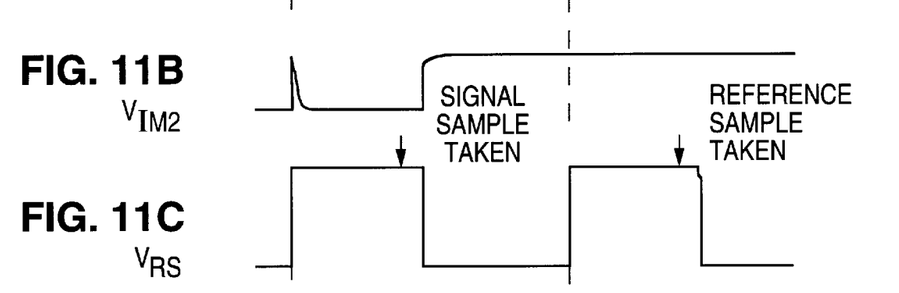
Figure 11D:
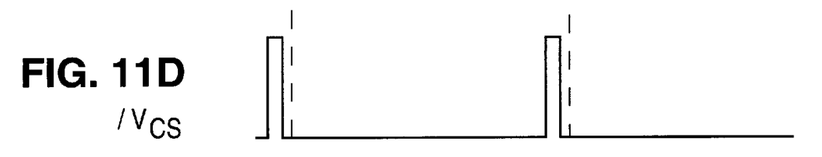

FIG. 8 shows a schematic diagram that illustrates a cell 200 in accordance with the present invention. As shown in FIG. 8, cell 200 is structurally similar to cell 100 of FIG. 4 and, as a result, utilizes the same reference numerals to designate the structures which are common to both cells.

As shown in FIG. 8, cell 200 principally differs from cell 100 in that cell 200 includes a switch transistor 230 which is connected between the power supply node $N_{PS}$ and the third intermediate node $N_{IM3}$ in lieu of switch transistor 130. In operation, cell 200 utilizes switch transistor 230 to place a defined voltage, namely the supply voltage Vcc, on the third intermediate node $N_{IM3}$ before cell 200 is read.

FIGS. 9A–9D show timing diagrams that illustrate the operation of cell 200 in accordance with the present invention. As shown in FIGS. 9A–9D, cell 200 is operated the same as shown in FIGS. 5A–5D except that the voltage on the second intermediate node $N_{IM2}$ (FIG. 9B) spikes up to the power supply voltage Vcc rather than ground when the row select voltage $V_{RS}$ is pulsed.

FIGS. 10A–10D and 11A–11D show timing diagrams that illustrate an alternate operation of cell 200 that correspond with FIGS. 6A–6D and 7A–7D in accordance with the present invention. As shown in FIGS. 10A–10D, cell 200 is operated the same as shown in FIGS. 9A–9D except that the rising edge of the reset voltage $V_{RESET}$ at time $t_4$ is set to occur after the falling edge of the row select voltage $V_{RS}$ that follows the rising edge at time $t_3$. FIGS. 11A–11D show timing diagrams that illustrate an enlarged view of loop L in FIGS. 10A–10D in accordance with the present invention.

The advantage of using switch transistor 230 over switch transistor 130 is that when the power supply voltage Vcc is placed on the third intermediate node $N_{IM3}$, current mirror 24 quickly assists in pulling down the voltage on node $N_{IM3}$ to the voltage on node $N_{IM2}$.

On the other hand, when the voltage on the third intermediate node $N_{IM3}$ is set to zero, the voltage on node $N_{IM3}$ is only pulled up to the voltage on node $N_{IM2}$ by the current sourced by buffer transistor 16 which, in turn, is a slower process due to the negative feedback inherent in a source-follower circuit. This is especially true for NMOS transistors that utilize a grounded p-well.

In addition, transistor 230 reduces the amount of charge that is lost from the cell when the cell is repeatedly sampled without a reset during applications which make use of the non-destructive readout property of a CMOS active pixel sensor cell. This charge loss is due to the dynamics of the source-follower gate-to-source capacitance as a function of the gate-to-source voltage (a charge pump effect). Experimental results have indicated that transistor 230 reduces the charge lost per readout by approximately 10× when compared to transistor 130.

It should be understood that various alternatives to the embodiment of the invention described herein may be employed in practicing the invention. For example, the concepts of the present invention can readily be applied to a row of cells in an array of cells. With an array of cells, a latch/column sense amplifier and a current mirror are utilized with each column of cells.

Thus, it is intended that the following claims define the scope of the invention and that methods and structures within the scope of these claims and their equivalents be covered thereby.

What is claimed is:

1. A method for operating an active pixel sensor cell, the active pixel sensor cell including:

a reset device having a first input, a photon collector connected to the reset device, the photon collector having a collected voltage;

a buffer device connected to the photon collector and the reset device, the buffer device outputting an intermediate voltage that corresponds to the collected voltage, and a row select device connected to the buffer device and a column line, the row select device having a second input, the method comprising the steps of:

collecting a number of photons in the photon collector, the number of collected photons setting the collected voltage to a first voltage, and the intermediate voltage to a second voltage;

placing a predetermined voltage on the column line;

pulsing the second input with a row select voltage after the predetermined voltage is placed on the column line, the row select voltage turning the row select device on and causing the second voltage to appear on the column line;

storing the second voltage on the column line;

pulsing the first input with a reset voltage, the reset voltage turning on the reset device and setting the collected voltage to a third voltage, and the intermediate voltage to a fourth voltage;

placing the predetermined voltage on the column line after the collected voltage is set to the third voltage;

pulsing the second input with the row select voltage after the predetermined voltage is placed on the column line a second time, the row select voltage turning on the row select device and causing the fourth voltage to appear on the column line; and calculating a voltage difference between the fourth voltage and the second voltage.

2. The method of claim 1 wherein the fourth voltage is greater than the second voltage.

3. The method of claim 1 wherein the reset device includes a transistor having a drain connected to a power supply node, a source connected to the photon collector, and a gate connected to receive the reset voltage.

4. The method of claim 3 wherein the reset voltage is greater than a voltage on the power supply node.

5. The method of claim 4 wherein the reset voltage causes the third voltage to be equal to the voltage on the power supply node.

6. The method of claim 1 wherein the photon collector is a photodiode.

7. The method of claim 1 wherein the buffer device includes a transistor having a drain connected to the power supply node, a source connected to the row select device, and a gate connected to the photon collector and the reset device.

8. The method of claim 1 wherein the row select device includes a transistor having a drain connected to the buffer device, a source connected to the column line, and a gate connected to receive the row select voltage.

9. The method of claim 1 wherein the predetermined voltage is ground.

10. The method of claim 1 wherein the predetermined voltage is equal to a power supply voltage.

11. A method for operating an active pixel sensor cell, the cell including:

a reset device having a first input, a photon collector connected to the reset device, the photon collector having a collected voltage;

a buffer device connected to the photon collector and the reset device, the buffer device outputting an intermediate voltage that corresponds to the collected voltage, a row select device having a buffer input connected to the buffer device, a second input, and an output, and a switch device connected to the output of the row select device, the switch device having a third input, the method comprising the steps of:

collecting a number of photons in the photon collector, the number of collected photons setting the collected voltage to a first voltage, and the intermediate voltage to a second voltage;

pulsing the third input with a column reset voltage, the column reset voltage turning the switch device on and causing a predetermined voltage to be placed on the output of the row select device;

pulsing the second input with a row select voltage after the predetermined voltage is placed on the output of the row select device, the row select voltage turning the row select device on and causing the second voltage to appear on the output;

storing the second voltage on the output of the row select device;

pulsing the first input with a reset voltage, the reset voltage turning on the reset device and setting the collected voltage to a third voltage, and the intermediate voltage to a fourth voltage;

pulsing the third input with the column reset voltage after the collected voltage is set to the third voltage, the column reset voltage turning the switch device on and causing the predetermined voltage to be placed on the output of the row select device;

pulsing the second input with the row select voltage after the predetermined voltage is placed on the output a second time, the row select voltage turning on the row select device and causing the fourth voltage to appear on the output; and calculating a voltage difference between the fourth voltage and the second voltage.

12. The method of claim 11 wherein the fourth voltage is greater than the second voltage.

13. The method of claim 11 wherein the reset device includes a transistor having a drain connected to a power supply node, a source connected to the photon collector, and a gate connected to receive the reset voltage.

14. The method of claim 13 wherein the reset voltage is greater than a voltage on the power supply node.

15. The method of claim 14 wherein the reset voltage causes the third voltage to be equal to the voltage on the power supply node.

16. The method of claim 11 wherein the predetermined voltage is ground.

17. The method of claim 11 wherein the predetermined voltage is equal to a power supply voltage.

18. The method of claim 11 wherein the switch device is a transistor having a drain connected to the output, a source connected to ground, and a gate connected to receive the column reset voltage.

19. The method of claim 11 wherein the switch device is a transistor having a drain connected to the output, a source connected to a power supply node, and a gate connected to receive the column reset voltage.

20. An active pixel sensor cell comprising:

a reset device having a first input;

a photon collector connected to the reset device, the photon collector having a collected voltage;

a buffer device connected to the photon collector and the reset device, the buffer device outputting an intermediate voltage that corresponds to the collected voltage;

a row select device having a buffer input connected to the buffer device, a second input, and an output; and a switch device connected to the output of the row select device, the switch device placing a predetermined voltage on the output of the row select device when turned on.

21. The cell of claim 20 wherein the switch device is a transistor having a drain connected to the output of the row select device, a source connected to ground, and a gate connected to receive a column reset voltage.

22. The cell of claim 20 wherein the switch device is a transistor having a drain connected to the output of the row select device, a source connected to a power supply, and a gate connected to receive a column reset voltage.

* * * * *